United States Patent [19]

Holcombe, Jr. et al.

[11] Patent Number: 4,741,775

[45] Date of Patent: May 3, 1988

[54] HIGH TEMPERATURE INK WITH AMBIENT TEMPERATURE UTILITY AND METHOD OF PREPARATION

[75] Inventors: Cressie E. Holcombe, Jr., Knox County; Lloyd R. Chapman, Anderson County, both of Tenn.

[73] Assignee: ZYP Coatings, Inc., Oak Ridge, Tenn.

[21] Appl. No.: 927,520

[22] Filed: Nov. 6, 1986

[51] Int. Cl.$^4$ ............................................. C09D 11/00
[52] U.S. Cl. ........................................ 106/20; 106/23; 106/26; 106/287.34; 106/300; 106/308 B
[58] Field of Search .................... 106/20, 23, 26, 300, 106/308 B, 287.34

[56] References Cited

U.S. PATENT DOCUMENTS

| | | | |
|---|---|---|---|
| 2,668,149 | 2/1954 | Iler | 252/313.1 |
| 2,978,361 | 4/1961 | Seidl | 427/419.2 |
| 3,130,061 | 4/1964 | McMahon et al. | 106/287.1 |
| 3,180,746 | 4/1965 | Patton et al. | 106/14.21 |
| 3,180,747 | 4/1965 | Patton et al. | 106/14.21 |
| 4,066,598 | 1/1978 | Beers et al. | 252/389.3 |
| 4,479,824 | 10/1984 | Schutt | 106/14.21 |

*Primary Examiner*—Paul Lieberman
*Assistant Examiner*—Willie J. Thompson
*Attorney, Agent, or Firm*—Pitts and Brittian

[57] ABSTRACT

A composition to produce an adherent and water insoluble deposit on substrate surfaces. An ink or other coating material for these surfaces is described which can be applied at any temperature up to at least 2,000 degrees Fahrenheit, with the resultant deposit (after drying) being highly adherent and water insoluble. As an ink, this composition is useful to produce bar codes on metals to identify the composition, heat treatment, customer, sections for other processing, etc. This ink (coating) has a liquid phase formed from at least water, a pre-reacted lithium silicate, and unreacted lithium hydroxide monohydrate. Preferably, the liquid phase contains a dispersent in the form of a clay, for example. Typically the pre-reacted $Li_2O-SiO_2$ has a $SiO_2:Li_2O$ molar ratio of about 4.6:1, and the unreacted $LiOH \cdot H_2O$ provides from ⅓ to ⅔ the total lithium oxide content, giving a final $SiO:Li_2O$ molar ratio of the composition of from about 1.71:1 to about 2.97:1. To this liquid phase is added a pigment, typically $TiO_2$ or $MnO-Fe_2O_3$ at about 12–60 wt % based upon the liquid phase. A range of compositions is discussed as well as typical results.

20 Claims, No Drawings

HIGH TEMPERATURE INK WITH AMBIENT TEMPERATURE UTILITY AND METHOD OF PREPARATION

TECHNICAL FIELD

This invention relates to ink-type marking fluids, and more particularly to ink compositions for applying markings, such as bar codes and the like, to substrates such as metals. The specific inks are non-soluble in water when dry, and have high adherence from ambient temperatures ($-20$ to 100 degrees F.) to elevated temperatures (about 2000 degrees F.).

BACKGROUND ART

In the metallurgical art, for example, it is a common practice to mark metal ingots, sheets, etc., with a designation or code to identify the composition, heat treatment, customer, etc., of the particular piece. Also, certain portions of these objects are often marked in certain areas or sections to identify later cutting, heat treatment, etc. This marking often takes the form of thin lines or a bar code as applied by a computer-controlled jet printer. Such lines or codes are applied to both cold and hot metals, as well as clean-surfaced or oxidized-surface metals and are generally read with a scanner. Frequently, this marking is carried out while the substrate is at elevated temperatures. White pigmented inks are generally used for steels and dark inks are used for aluminum and other shiny metals. Similar inks are used for substrates other than metal, also.

Inks currently used in the art often contain organic solvents and additives. In addition to the production of volatiles of potential hazard, such solvents or additives char at elevated temperatures and thereby contribute to a reduction in "readability" of the code. Furthermore, many of the commercial inks have a limited solubility, and storage of marked metals in open yards where such are subjected to rain/snow leads to poor readability of the codes after relatively short storage. Still another problem experienced in the art is the failure of inks that can be applied at high temperature when used near room temperature and vice versa. Thus, two separate types of inks have been used in the prior art: one for hot applications and one for cold or ambient temperature applications. Yet another problem with inks of the prior art is the settling out of pigments and other solid constituents giving rise to problems in the jets of the printers. Also, some constituents of low temperature inks are not compatible with those of the high temperature inks thereby necessitating care in cleaning the printer system before changing types of inks.

Various lithium silicate compositions are known in the art as applied to coatings for metal, wood, cloth, etc. Some of these are used for sealing the surfaces of the respective "substrates", for reducing flammability and even for joining layers of the substrate. Typical of the art are the compositions described in U.S. Pat. Nos. 2,668,149, issued to R. K. Iler on Feb. 2, 1954; 2,978,361, issued to A. Seidl on Apr. 4, 1961; 3,130,061, issued to W. M. McMahon, et al., on Apr. 21, 1964; 3,180,746 and 3,180,747, issued to R. H. Patton, et al., on Apr. 27, 1985; 3,392,039, issued to F. L. Cuneo on July 9, 1968; 3,455,709, issued to G. W. Sears on July 15, 1967; and 3,565,575, issued to R. H. Sams on Feb. 23, 1971. None of these references discuss adherence at elevated temperature or their application to metals in all conditions of oxidation such as those experienced in the metallurgical processing art. Further, as set forth in the experimental evidence provided herein, several of the compositions did not provide an adherent coating when applied in strips as a bar code or when applied over a narrow or wide area. Some of the references do discuss the use of pigments (titanium dioxide, iron oxide, etc.), and the use of clays as "extenders" and as "binders". A study of these compositions revealed that none of the compositions were suitable to provide the numerous characteristics required for an ink for use over the wide range of temperature from room temperature to about 2,000 degrees F.

Accordingly, it is a primary object of the present invention to provide an ink of a singular composition that results in a marking/coating that can be applied to either cold or hot surfaces.

It is a further object of the invention to provide a marking ink or coating which, when applied to metal or other surfaces, is water insoluble and adherent after drying.

It is a further object of the invention to provide a marking ink or coating that will withstand a re-heating to several hundred degrees.

It is another object of the present invention to provide an ink for marking or coating of metals and other substrates that can be applied to dry surfaces without further preconditioning of the surfaces.

It is still an additional object of the invention to provide an ink for use in jet printers to affix a bar code to metal components to identify alloy composition, heat treatment, customer, areas for later cutting, etc., with the ink suitable for application at temperatures ranging from room temperature to about 2,000 degrees Fahrenheit.

It is also an object to provide a method for the preparation of inks for the various uses set forth herein.

These and other objects of the present invention will become apparent upon a consideration of the full description given hereinafter.

DISCLOSURE OF THE INVENTION

According to the present invention, a marking ink or a coating composition is provided wherein a base liquid which is a reacted solution of colloidal silica and lithium hydroxide into which unreacted lithium hydroxide monohydrate powder is dissolved, is combined with a pigment that is compatible with extremely basic solutions. More specifically, the composition contains from about ⅓ to ⅔ of the total $Li_2O$ content as commercial lithium silicate solution (silica gel reacted with LiOH), about ⅓ to ⅔ of the total $Li_2O$ content as unreacted lithium hydroxide monohydrate, and about 10–50 wt % of a suitable pigment selected from the oxides (or mixed oxides) of the transition elements. The resultant composition can be applied to metal surfaces over a temperature range from room temperature to at least 2,000 degrees Fahrenheit and is insoluble in water after drying. Furthermore, no detrimental effects upon the marking/coating are noted upon reheat after application. In the preferred embodiment, the liquid composition comprises about 37 wt % water, 58.5% lithium silicate solution (4.6:1 molar ratios of $SiO_2:Li_2O$) having 75–80% water content, about 4 wt % $LiOH \cdot H_2O$ and about 0.5 wt % suspension agent-binder. To this is added about 12–60% (based on liquid weight) of a pigment selected from $TiO_2$ and $MnO_2\text{-}Fe_2O_3$.

BEST MODE FOR CARRYING OUT THE INVENTION

Lithium silicate solutions are available from several commercial chemical companies. For example, the Lithium Company of America manufactures "Lithsil-4" having a $SiO_2:Li_2O$ mole ratio of 4.5 to 5.0; and, "Lithsil-6" having a $SiO_2:Li_2O$ mole ratio of 5.6 to 6.3. The Foote Mineral Company manufactures a lithium silicate solution having a $SiO_2:Li_2O$ mole ratio of 4.23. (These mole ratio values are taken from bulletins issued by these companies.) These commercial silicate solutions contain 75-80% water. Generally, the lithium silicate solutions are formed by reacting colloidal silica with lithium hydroxide (LiOH) at temperatures up to about 150 degrees Centigrade (see U.S. Pat. No. 3,180,747). Another method, giving rise to higher $SiO_2:Li_2O$ mole ratios (up to 25), is described in U.S. Pat. No. 2,668,149.

The lithium silicates described in the prior art are indicated as producing water insoluble coatings when applied on various materials. Accordingly, one of the commercial lithium silicate solutions (Lithsil-4) was tested as a "carrier" for a pigment in the preparation of an ink for the above-defined applications; i.e., jet-applied markings for metal ingots, etc. Thin lines, as well as wide areas, of a water solution of the Lithsil-4 were applied to a stainless steel spatula and allowed to dry. Thereafter, the adherence and water insolubility at room temperature were observed. As indicated in Table 1 very poor adherence was observed as the deposit was easily dusted off the spatula upon drying.

Studies were then conducted of an ink wherein lithium hydroxide monohydride was dissolved in the already reacted lithium silicate. Solutions were again prepared with the Lithsil-4 and water. These ink solutions (with some $TiO_2$ pigment) were applied in narrow strips and wide areas to the same type of stainless steel spatula. As reported in the further data of Table 1, when about 1.08 wt % (wt % in the liquid phase) additional lithium hydroxide monohydrate ($LiOH.H_2O$) was added, reasonable adherence and water insolubility was achieved at room temperature. As noted, increased adherence and water insolubility was achieved with increased amounts of the monohydrate. Optimum performance was observed when about 4.2 wt % $LiOH.H_2O$ was added to the base ink solution. This ink is referred to hereinafter as the "standard ink". However, a range of 2.15 wt % (−50% with respect to the amount for the standard) to nearly 6.17 wt % (+50%) gave satisfactory adherence and water solubility at room temperature when further tests were conducted on different metals. At higher $LiOH.H_2O$ additions, the ink was readily soluble.

Having determined the characteristics of the ink at room temperatures, elevated temperature tests were conducted. The results are summarized in Table 2.

TABLE 1

| $LiOH.H_2O$ % | DESIGNATION | RESULTS ON STAINLESS STEEL |
|---|---|---|
| 4.20 | Std. Ink | Excellent adherence, water insolubility very good |
| 6.17 | +50% | Water insolubility barely acceptable |
| 7.13 | +75% | No water insolubility |
| 8.06% | +100% | Washed off easily |
| 2.15 | −50% | Water insolubility very good |
| 1.08 | −75% | Water insolubility good |
| 0.545 | −87.5% | Poor adherence, water insolubility fair |
| Zero | −100% | Very poor adherence, dusts off |

TABLE 2

| METAL | DESIGNATION | OBSERVATION |
|---|---|---|
| 304L | +50% | 1-2 coats good, edge flaking on 3rd coat |
| | Std. Ink | 1-3 coats good |
| | −50% | 1 coat good, cracking and flaking on 2-3rd coats |
| 410 | +50% | 1 coat good, cracking and flaking on 2-3rd coats |
| | Std. Ink | 1-2 coats good, cracking and flaking on 3rd coat |
| | −50% | 1-3 coats good |
| 316 | Std. Ink | 1-2 coats good, some flaking on 3rd coat |

Coupons of type 304L stainless steel were used as a representative hi9h expansion material, and coupons of type 410 stainless steel were used as a representative of low expansion steels. Coupons of type 316 stainless steel were also tested. One, two and three coats of the ink were brushed on the coupons, with drying of each coat in air. The coupons of type 304L S.S. were heated in air over a period of 45 minutes to a temperature of 1832 degrees F (1,000 degrees C), followed by furnace cooling to 635 degrees C and then evaluated. For the 410 SS, the coupons were flash heated (10 minutes) to a temperature of 1,100 degrees F (593 degrees C) and air quenched. The 316 SS coupons were heated using the same schedule as those of 304L SS. As noted in the data, a single coat of all tests compositions (−50% to +50%) had good adherence and most exhibited good adherence when at least two coats were applied. When used as an ink for jet marking, a thickness equivalent to about one coat is applied (typically 0.001 in.). Substantially the same results were obtained on deposits applied at near room temperature, dried and then heated to elevated temperatures, thus corresponding to "reheat" conditions.

The results of tests on the levels of pigment additives, and types of pigments, are summarized in Table 3. The standard ink with 15% $TiO_2$ (based on liquid weight) provides satisfactory color distinction on relatively dark backgrounds and, as shown in the Table, exhibits excellent adherence and water insolubility.

TABLE 3

| | DESIGNATION | OBSERVATION |
|---|---|---|
| Std. Ink | +15% $TiO_2$ | Excellent adherence, water insolubility very good |
| | +60% $TiO_2$ | Water insolubility barely acceptable |
| | +48.75% $TiO_2$ | Water insolubility about as good as standard |
| | +37.5% $TiO_2$ | Water insolubility as good as standard |
| | +50% $MnO_2$—$Fe_2O_3$ (88% $MnO_2$, 12% $Fe_2O_3$) | Water insolubility about as good as standard |

(The "hiding power" of the $TiO_2$ at about 12% is minimal.) These data indicate that up to about 60% $TiO_2$ has little effect on the adherence and water insolubility of the deposit.

A satisfactory dark ink for use on shiny surfaces, for example, is prepared by adding a manganese oxide-iron oxide pigment. A typical composition is 88 wt % $MnO_2$-12 wt % $Fe_2O_3$. When up to 60% (based on wt of the liquid) of this pigment is added to the standard ink liquid, the ink exhibits good adherence and water insolubility. Other pigments formulated from oxides (typically silicates) of the transition metals also appear to perform about as well when used at up to 50-60%.

Referring now to Table 4, the standard ink has 31.5 mol% $Li_2O$ and 68.5 mol% $SiO_2$ giving a molar ratio of $SiO_2:Li_2O$ of 2.17. The +50% ink (50% increase of $LiOH.H_2O$ over the standard) has a $SiO_2:Li_2O$ molar ratio of 1.71, and the −50% ink has a molar ratio of 2.97. Commercial Lithsil-4 has a molar ratio of 4.6. The standard ink is made by dissolving in a commercial lithium silicate solution (pre-reacted $SiO_2$ and $Li_2O$) about ½ by weight of unreacted lithium hydroxide monohydrate (based upon the total $Li_2O$ content). Stated in another way, about one-half of the $Li_2O$ content of the standard ink is contained in the pre-reacted lithium silicate solution and about one-half of the $Li_2O$ content results from the unreacted lithium hydroxide monohydrate.

TABLE 4

| DESIG-NATION | MOLAR RATIO $Li_2O:SiO_2$ | WT. FRACTION $Li_2O:SiO_2$ | M.P. (APPROX.) |
|---|---|---|---|
| Std. | 31.5%:68.5% | 18.7%:81.3% | 1032 C* |
| +50% | 36.9%:63.1% | 22.6%:77.4% | 1075 C |
| −50% | 25.2%:74.8% | 14.4%:85.6% | 1200 C* |
| Lithsil-4 | 17.5%:82.5% | 9.6%:90.4% | 1500 C* |

*Liquid starts about 1028 degrees Centigrade

The −50% and +50% inks are made by adding about ⅓ and ⅔ unreacted $LiOH_2O$, respectively.

When pigments are added to form inks, these pigment solids are prone to settle. Although stirring equipment is often standard on jet ink sprayers, a reduced settling was investigated through the addition of suspension agents. Two types of suspension agents were tested relative to the lithium silicate standard ink: sodium carboxymethylcellulose (CMC) at 2 to 3% based on the water content of the ink liquid; and various bentonite and related clays at 0.5 to 5.4 wt %. Both types of suspension agents provided some improvement in the settling characteristics of the ink. They had no adverse affects upon adherence or water insolubility at these levels of addition. Highly beneficiated hectorite was about the best of the clay suspension agents tested.

In order to determine the quantity of $LiOH.H_2O$ that is to be added to any given commercial (or pre-reacted) lithium silicate, the designation $R_2O$ is used for $Li_2O$ or the equivalent oxide in the composition (e.g., Li and Na in Lithsil-S). Then writing $LiOH.H_2O$ as $Li_2O.3H_2O$, the $R_2O:SiO_2$ ratio can be calculated. Thus, if the $R_2O$ content of the pre-reacted silicate of one starting material is lower than another, more of the lithium monohydrate is added to keep the total molar ratio $R_2O:SiO_2$ constant. In the preferred standard ink this ratio is 0.46.

Based upon the numerous tests performed upon the inks, the following compositional ranges of constituents are acceptable:

| | |
|---|---|
| 27.3-44.5 | wt % water |
| 55-65 | wt % pre-reacted lithium silicate solution |
| | (75-80% water) |
| 2.2-6.2 | wt % $LiOH.H_2O$ |
| 0.5-1.5 | wt % suspension agent |
| 100% | liquid |
| 12-60 | wt % pigment (based upon liquid) |

The $Li_2O:SiO_2$ ratio for these satisfactory inks varies from about 0.34 to about 0.60. The overall water content in the ink liquid varies from about 82-86% due to the high water content of the commercial solutions. A preferred ink has a composition:

36.9 wt % water
58.4 wt % pre-reacted lithium silicate $SiO_2:Li_2O$ molar ratio of 4.6
4.2 wt % $LiOH.H_2O$
0.5 wt % highly beneficiated Hectorite clay
20 wt % (based on liquid) $TiO_2$ or 50% $MnO-Fe_2O_3$ (88 wt % - 12 wt %)

Although the above-described compositions have been referred to as an ink, the same compositions can be used as coatings for substrates such as metals, ceramics, glass and graphite much as are paints. Thus, the present invention is not to be limited by the applications of the composition.

In certain applications, a thick paste-like marking ink (i.e., a flexogravure ink) is required. One such application for such an ink is in the marking of rubber inner tubes for tires. These tubes are marked when hot (about 240 degrees F) and then water quenched prior to steam autoclaving. A flexogravure ink can be produced from the above-described inks by the addition of extra highly beneficiated hectorite clay, typically 2-5% based upon the total weight of the ink liquid plus pigment. The above-described inks have a large proportion of water: up to 86 wt % when water and the lithium silicate solutions are added. Of course, when these inks (or coatings) are dried, the resultant marking contains only the lithia, silicia, pigment and any of the residual clay. For example, an ink with a suitable range of $Li_2O$ and $SiO_2$, and with 60 wt % pigment, results in a deposit of about 3.7 to 10.4 wt % (8.9 to 20.9 mol %) $Li_2O$, about 16.2 to 45 wt % $SiO_2$, with the remainder being the pigment ($TiO_2$ or $MnO_2$-$Fe_2O_3$). The melting points of these compositions range from 1,300-1,600 degrees C (2,372-2,912 degrees F). For the preferred ink cited above, when the pigment is $TiO_2$ at 20 wt % of the ink liquid, the resultant deposit is expressed as $0.50Li_2O.1.0$-$7SiO_2.1.0\ TiO_2$ or 9.33 wt % $Li_2O$, 40.47 wt % $SiO_2$, 50.20 wt % TiO . The corresponding dark ink made using the $MnO_2$-$Fe_2O_3$ pigment at 50 wt % results in a deposit that can be expressed as $1.0\ MnO_2.0.07Fe_2O_3.0\ 0.18Li_2O.0.40SiO_2$. This deposit has 67.98 wt % $MnO_2$, 9.09 wt % $Fe_2O_3$, 4.29 wt % $Li_2O$ and 18.63 wt % $SiO_2$. The ratio of $SiO_2$ to $Li_2O$ in these deposits is about 4.34:1.

From the foregoing, it will be recognized by persons versed in the art that an ink (or coating) has been developed that can be used at both room temperature or elevated temperature for applications on the above-identified substrates. The resultant deposit on the substrates has high adherence and good water insolubility. In the applications as a marking ink to identify metal ingots, sheets, etc., the composition is suitable at these extremes of temperature giving rise to markings via jet printers that can be machine or visually read.

Although a limited number of compositions have been identified, a range of compositions has been bracketed. It will be recognized that the invention is not to be limited by these tested compositions but is defined by the appended claims and their equivalents.

We claim:

1. A composition for applying to surfaces of substrates at temperatures up to at least 2,000 degrees Fahrenheit to form visible deposits that are adherent and water insoluble at room temperature, which comprises:

a liquid phase consisting essentially of about 82-wt % to about 86 wt % water and about 14 wt % to about 18 wt % $R_2O$ and $SiO_2$, where $R_2O$ is selected from $Li_2O$ and a mixture of $Li_2O$ and $Na_2O$, said $R_2O$ and $SiO_2$ having a molar ratio of about 0.34 to about 0.60, said $Li_2O$ of said $R_2O$ being present in about ⅓ to ⅔ unreacted form relative to said $SiO_2$; and a pigment of 12–60 wt %, based upon said liquid phase, said pigment selected from oxides and oxide mixtures containing transition metals.

2. The composition of claim 1 further comprising a suspension agent in said liquid phase, said suspension agent present at about 0.5 wt % to about 5 wt % based upon said water content, and selected from highly beneficiated clays and sodium carboxymethylcellulose.

3. The composition of claim 1 wherein said $R_2O$ is $Li_2O$, said $Li_2O$ derived from pre-reacted $Li_2O$-$SiO_2$ and from unreacted $LiOH.H_2O$.

4. The composition of claim 1 wherein said $R_2O$ is a mixture of $Li_2O$ and $Na_2O$, a portion of said $Li_2O$ derived from pre-reacted $Li_2O$-$Na_2O$-$SiO_2$, and the remainder derived from unreacted $LiOH.H_2O$.

5. The composition of claim 3 wherein said pre-reacted $Li_2O$-$SiO_2$ has a molar ratio of $SiO_2$:$Li_2O$ of about 4.2:1 to about 6.3:1.

6. The composition of claim 1 wherein said pigment is selected from a group consisting of $TiO_2$ and 88% $MnO_2$-12% $Fe_2O_3$.

7. The composition of claim 2 wherein said suspension agent is highly beneficiated hectorite clay.

8. The composition of claim 2 wherein said suspension agent is highly beneficiated hectorite clay, and said pigment is $TiO_2$.

9. The composition of claim 2 wherein said suspension agent is highly beneficiated hectorite clay, and said pigment is 88% $MnO$-12% $Fe_2O_3$.

10. The composition of claim 6 wherein said pigment is $TiO_2$.

11. A composition for applying to surfaces of metal objects at temperatures up to at least 2,000 degrees Fahrenheit to form visible deposits that are adherent and water insoluble at room temperature, and undamaged upon reheat, which comprises:

a liquid phase consisting essentially of about 27 wt % to about 45 wt % water, about 55 wt % to about 65 wt % pre-reacted lithium silicate solution having a 75–80% water content and a $SiO_2$:$Li_2O$ molar ratio of about 4.6:1 to about 6.3:1, about 22 wt % to about 6.2 wt % unreacted $Li_2O.H_2O$ the combined $SiO_2$:$Li_2O$ molar ratio being about 2.97:1 to about 1.71:1, and about 0.5 to about 1.5 wt %, suspension agent of a highly beneficiated hectorite clay based upon said water content; and about 12 wt % to about 60 wt %, based upon said liquid phase, of a pigment selected from $TiO_2$ and 88% $MnO_2$-12% $Fe_2O_3$.

12. The composition of claim 11 wherein said water is about 36.9 wt %, said pre-reacted $Li_2O$-$SiO_2$ is about 58.4 wt % and has a molar ratio of $SiO_2$:$Li_2O$ of about 4.6:1, said unreacted $Li_2O.H_2O$ is about 4.2 wt %, said clay is about 1 wt %; and said pigment is $TiO_2$ at about 20 wt % of the weight of said liquid phase.

13. The composition of claim 11 wherein said water is about 36.9 wt %, said pre-reacted $Li_2O$-$SiO_2$ is about 58.4 wt % and has a molar ratio of $SiO_2$:$Li_2O$ of about 4.6:1, said unreacted $LiOH.H_2O$ is about 4.2 wt %, said clay is about 0.5 wt %; and said pigment is 88% $MnO$-12% $Fe_2O_3$ at about 50 wt %.

14. A method of preparing a composition for application to surfaces of substrates at temperatures up to at least 2,000 degrees Fahrenheit to form visible deposits that are adherent and water insoluble at about room temperature, which comprises:

preparing a liquid phase by mixing about 27 wt % to about 45 wt % water, about 55 wt % to about 65 wt % pre-reacted $Li_2O$-$SiO_2$ solution having about 75–80% water content and having a $SiO_2$:$Li_2O$ molar ratio of about 4.2:1 to about 6.3:1, about 2.2 wt % to about 6.2 wt % unreacted $LiOH.H_2$, and about 0.5 wt % to about 1.5 wt % of a highly beneficiated suspension clay; and mixing with said liquid phase about 12 wt % to about 60 wt %, based upon said liquid phase, of a pigment selected from $TiO_2$ and 88% $MnO$-12% $Fe_2O_3$.

15. The method of claim 14 wherein said water is about 36.9 wt %, said pre-reacted $Li_2O$-$SiO_2$ solution is 58.4 wt % and has a molar ratio of $SiO_2$:$Li_2O$ of about 4.6:1, said unreacted $LiOH.H_2O$ is about 4.2 wt %, said clay is highly beneficiated hectorite clay of 0.5 wt %, and said pigment is $TiO_2$ at about 20 wt %.

16. The method of claim 14 wherein said water is about 36.9 wt %, said pre-reacted $Li_2O$-$SiO_2$ solution is 58.4 wt % and has a molar ratio of $SiO_2$:$Li_2O$ of about 4.6:1, said unreacted $LiOH.H_2O$ is about 4.2 wt %, said clay is highly beneficiated hectorite clay of 0.5 wt %, and said pigment is 88% $MnO$-12% $Fe_2O_3$ at about 50 wt %.

17. The method of claim 14 wherein said substrate is metal, and further comprising the step of passing said composition through a jet sprayer to produce said deposit upon said surface in the form of bar codes to identify said metal.

18. A visible composition applied to surfaces of substrates, said composition exhibiting stability at temperatures up to at least 2,000 degrees Fahrenheit and being adherent and water insoluble at room temperature, which comprises:

a mixture of $SiO_2$ and $Li_2O$ having a $SiO_2$:$Li_2O$ weight ratio of about 4.34, about ⅓ to ⅔ said $Li_2O$ derived from unreacted $LiOH.H_2O$; and about 12–60% wt %, based upon said $SiO_2$-$Li_2O$ of a pigment selected from oxides and mixed oxides containing transition metals.

19. The composition of claim 18 wherein said composition is 40.47 wt % $SiO_2$, 9.33 wt % $Li_2O$ and 50.20 wt % $TiO_2$.

20. The composition of claim 18 wherein said composition is 18.63 wt % $SiO_2$, 4.29 wt % $Li_2O$, 9.09 wt % $Fe_2O_3$ and 67.98 wt % $MnO_2$.

* * * * *